United States Patent [19]

Tueckmantel et al.

[11] Patent Number: 4,662,506
[45] Date of Patent: May 5, 1987

[54] APPARATUS FOR SEPARATING ELONGATED NONSTRAIGHT ELEMENTS

[75] Inventors: Eberhardt Tueckmantel, Hilden; Dieter Japs, Solingen, both of Fed. Rep. of Germany

[73] Assignee: Th. Kieserling & Albrecht GmbH & Co. Werkzeugmaschinenfabrik, Solingen, Fed. Rep. of Germany

[21] Appl. No.: 769,245

[22] Filed: Aug. 26, 1985

[30] Foreign Application Priority Data

Sep. 28, 1984 [DE] Fed. Rep. of Germany ....... 3435635

[51] Int. Cl.⁴ .............................................. B65G 37/00
[52] U.S. Cl. .................................. 198/463.5; 198/444; 198/457; 198/468.7; 198/468.2; 414/748
[58] Field of Search ............... 198/434, 437, 443, 444, 198/463.2, 463.3, 463.5, 464.2, 464.4, 468.01, 468.2, 468.6, 468.7, 468.8, 468.1, 468.11, 473.1, 474.1, 475.1; 414/745, 747, 748, 22, 23

[56] References Cited

U.S. PATENT DOCUMENTS

| | | | |
|---|---|---|---|
| 2,820,573 | 1/1958 | McConnell | 198/463.5 X |
| 3,108,699 | 10/1963 | Anschutz | 414/745 X |
| 3,168,190 | 2/1965 | Nienstedt | 198/444 |
| 3,587,822 | 6/1971 | White | 414/748 X |
| 3,618,741 | 11/1971 | Berndt | 414/748 X |
| 4,219,301 | 8/1980 | Freeman | 198/464.2 X |

FOREIGN PATENT DOCUMENTS

| | | | |
|---|---|---|---|
| 2054831 | 5/1972 | Fed. Rep. of Germany | 198/443 |
| 0817198 | 7/1959 | United Kingdom | 198/463.5 |
| 0854845 | 8/1981 | U.S.S.R. | 198/463.5 |

Primary Examiner—Joseph E. Valenza
Assistant Examiner—Lyle Kimms

[57] ABSTRACT

A separating apparatus for nonstraight rods has a transverse conveyor adapted to support a plurality of elongated elements extending generally parallel to one another and is capable of displacing the plurality of elements in an approximately horizontal transport direction transverse to the elements. A second conveyor at the downstream end of the transverse conveyor can displace the elements one at a time in a preferably horizontal transport direction extending longitudinally generally parallel to the elements. A single stationary stop at the downstream end of the transverse conveyor close to one end of the elements has a stop surface extending upward therefrom, facing upstream in the transverse direction, and having an upper end spaced thereabove. A single lifter displaceable upward along the stop surface can lift an element engaged thereagainst up past the upper end of the stop surface where a transverse pusher can receive the element at the upper end from the lifter and deposit the received element in the second conveyor.

10 Claims, 3 Drawing Figures

U.S. Patent May 5, 1987 4,662,506
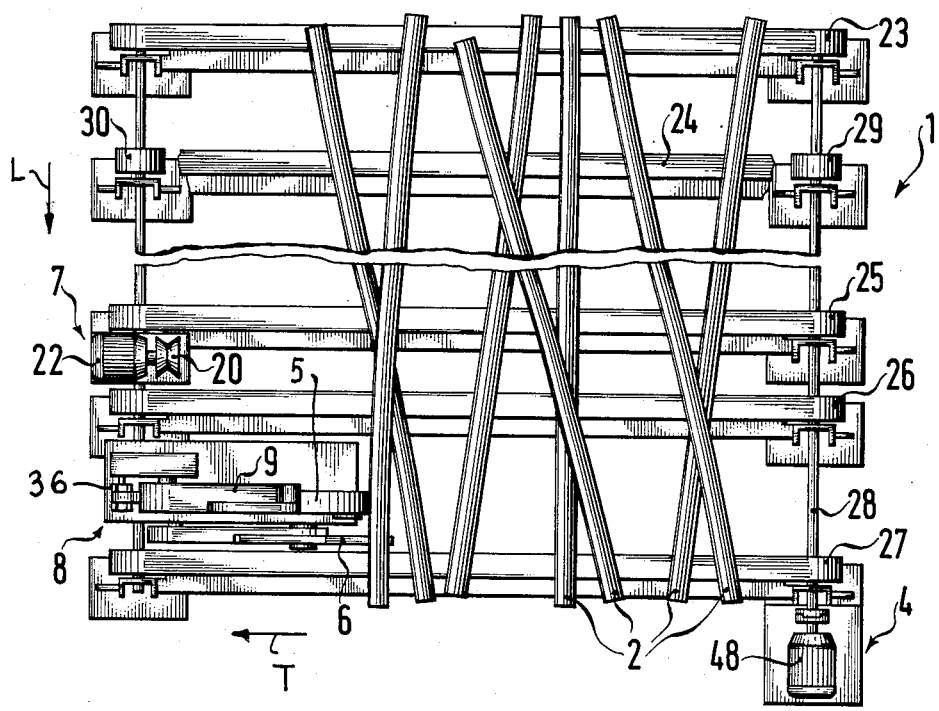
FIG. 1
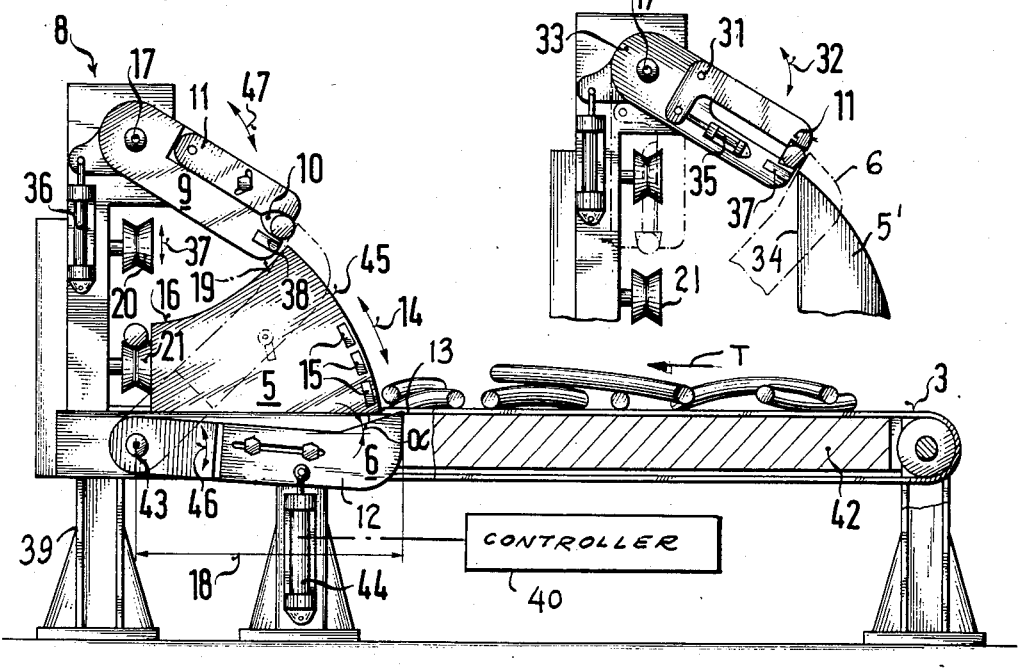
FIG. 2
FIG. 3

APPARATUS FOR SEPARATING ELONGATED NONSTRAIGHT ELEMENTS

FIELD OF THE INVENTION

The present invention relates to an apparatus for separating elongated elements such as lengths of rod or wire from one another. More particularly this invention concerns such an apparatus which can take in a bunch of mainly nonparallel elongated and mostly curved elements and deliver them one at a time to a treatment machine.

BACKGROUND OF THE INVENTION

In various mill operations, for instance the production of reinforcing bars, elongated elements are received in bundles. The elements are usually not perfectly straight, and when a bundle is broken open they often lie somewhat across one another in a nonparallel somewhat random array.

The standard machine for separating out the rods from such a random assortment is described in German patent document No. 1,452,072. It has an elongated upwardly V-shaped bed into which the bunch of elements is dropped. A plurality of conveyor elements engage across the bottom of the bed at a height calculated to be that of one of the elements and sweep up the side. Thus in theory at least two of the elements will catch on the lowermost rod and it will be pushed up through the pile atop it to the top of one of the sides of the bed, whence it will be dropped down onto a second conveyor.

With such an arrangement it is possible for some of the conveyor stops to catch on one rod and some on another so that one or both fall off. When an element is not caught all along its length it can fall back down into the bed, so that the straightening or coating machine downstream does not receive a workpiece for at least one cycle. It is also fairly common for an element, in particular when it is fairly bendable and elastic, to catch at the top of the machine and jam up or fall over with the next element.

Thus with such devices it is standard to have to sort the elements and keep a close eye on the separation operation. Any jams must be cleared manually, and excessively curved workpieces must be culled out and fed manually at the end.

OBJECTS OF THE INVENTION

It is therefore an object of the present invention to provide an improved apparatus for separating even nonstraight elongated elements.

Another object is the provision of such a apparatus for separating straight or nonstraight elongated elements which overcomes the above-given disadvantages, that is which surely and accurately pulls the elements one at a time out of a random criss-cross array and delivers them accurately one at a time via a conveyor to a downstream work station.

SUMMARY OF THE INVENTION

A separating apparatus according to the invention has a transverse conveyor adapted to support a plurality of elongated elements extending generally parallel to one another and is capable of displacing the plurality of elements in an approximately horizontal transport direction transverse to the elements. A second conveyor at the downstream end of the transverse conveyor can displace the elements one at a time in a preferably horizontal transport direction extending longitudinally generally parallel to the elements. A single stationary stop at the downstream end of the transverse conveyor close to one end of the elements has a stop surface extending upward therefrom, facing upstream in the transverse direction, and having an upper end spaced thereabove. A single lifter displaceable upward along the stop surface can lift an element engaged thereagainst up past the upper end of the stop surface where a transverse pusher can receive the element at the upper end from the lifter and deposit the received element in the second conveyor.

With this arrangement therefore it is possible to move the whole group toward the stop surface and to move all the elements when one is detected to be engaging this surface. Then the lifter selects out this one element and lifts it up, whence it is pushed into the working area of the second conveyor and carried off. The system need only handle one end of the separated element, and in fact the opposite end of the lifted element can in an intermediate stage still lie upstream under several other such elements.

It is also possible to make the transverse pusher and stop so they can be lowered. In this manner the lifter is replaced by the movability of the stop and the transverse pusher.

According to this invention the transverse pusher has a mouth and is displaceable between a receiving position with the mouth open downward at the upper end and a drop off position above the second conveyor. The transverse pusher is pivotal between its positions and in the receiving position the mouth forms a continuation of the stop surface. The width of the mouth according to this invention is adjustable so it can be set generally to the diameter of the elements being separated.

The lifter of the present invention is formed as an arm pivotal about an axis and having a tip projecting from the axis past the stop surface. The stop surface is arcuate and generally centered on the axis. In addition the arm is of adjustable length so that the extent its tip projects past the stop surface can be set generally to the diameter of the elements being separated. The tip forms with the stop surface an upwardly V-shaped seat for the elements.

In accordance with further features of this invention the second conveyor is a longitudinal conveyor including a pair of rollers vertically oppositely engageable with one of the elements at the downstream end of the transverse conveyor. Such a conveyor can effectively pull a separated rod out from under a pile of such rods.

DESCRIPTION OF THE DRAWING

The above and other features and advantages will become more readily apparent from the following, reference being made to the accompanying drawing in which:

FIG. 1 is a partly broken-away top view of the apparatus according to the present invention;

FIG. 2 is a partly sectional end view of the apparatus; and

FIG. 3 is a detail view of a variant on the apparatus of this invention.

SPECIFIC DESCRIPTION

As seen in FIGS. 1 and 2 the apparatus according to this invention basically comprises a transverse conveyor 1 for moving a group of rods 2 in a transverse direction T, a separating unit 8 for separating the rods 2 from one another, and a longitudinal conveyor 7 at the downstream end of the transverse conveyor 1 for carrying off individual rods 2 that have been separated from the group by the unit 8.

The transverse conveyor 1 has a planar horizontal transport surface 3 adapted to move in the transverse transport direction T. To this end it comprises five belts 23, 24, 25, 26, and 27 spanned over upstream drive wheels 29 and downstream idler wheels 30 and having upper stretches defining the transport surface 3 and supported by backing plates 42. The wheels 29 are all carried on a shaft 28 driven by a common motor 48 of a drive 4 operated, like all the other motors and actuators described below, from a microprocessor-type controller 40. In use a group of similar nonstraight rods 2 are dumped on the surface extending generally transverse of the direction T, but lying as illustrated in a criss-cross manner somewhat on top of one another.

The separating unit 8 is at the downstream corner, relative to the directions T and L, of the conveyor surface 3 and has a stop plate 5 having a guide edge 45 that is arcuate with a center of curvature at 43 and generally perpendicular to the surface 3 where it meets it between the belts 26 and 27. As the rods 2 are advanced in the direction T their downstream ends relative to the direction L will be pressed against this surface 45 and stopped. Several sensors 15, normally of the magnetic type, are provided above one another adjacent the surface 45 to detect if any rods 2 are touching this surface 45. Since the rods 2 can be heaped up so that one contacts the surface 45 well above the surface 3, it is necessary to provide the sensors 15 at least three rods high so that whenever a rod 2 engages this surface 45 it will be detected, with an appropriate signal then sent to the controller 40.

In addition a lifting arm 6 is pivoted on the machine frame 39 so it can sweep along the stop plate 5. It has an outer part 12 forming a tip 13 having an upward surface 19 extending at a very acute angle 2 relative to a radius from the axis 43 and an overall length 18 from the axis 43 which is greater than the radius of curvature of the surface 45 so the tip 13 projects past the surface 45 by a certain distance. The outer part 12 can be moved on the arm 6 to allow this overreach to be adjusted to be equal to the rod diameter. A fluid actuator 44 operated by the controller 40 can pivot the arm 6 between the lower position wholly below the surface 3 and shown in solid lines and an upper position somewhat past the upper end of the surface 45.

Above the stop plate 5 is another arm 9 pivotal about an axis 17 parallel to and above the axis 43 and formed with a downwardly open mouth that can be aligned to be just at the top edge of the surface 45. An actuator 36 can pivot this arm 9 as illustrated by arrow 47 between the illustrated receiving position in which its mouth 10 is open at the upper end of the surface 45 and a drop off position in which the arm 9 projects straight down from its axis 17. The width of the mouth 10 can be varied and a sensor 38 is provided to detect when a rod 2 has been fitted to it. Furthermore the upper edge 16 of the plate 5 is arcuate about the center 17 so that a rod 2 in the mouth 10 can slide along it as the arm 9 moves from its receiving to its drop off position.

The longitudinal conveyor 7 is provided immediately upstream in the direction L from the separating unit 8 and comprises a lower V-groove roller 21 rotating about a horizontal axis parallel to the direction T and an upper roller 20 that is powered by a respective motor 22 and that can be raised and lowered as indicated by arrow 37. The roller 21 is aligned with the lower downstream end of the surface 16 so it can receive a bar 2 that is slid therealong by the arm 9.

The apparatus described above operates as follows:

After a group of rods 2 is dumped on the conveyor 1 with the rods 2 all extending generally crosswise of the direction T, the controller 40 starts the motor 48 to advance these rods 2 in the direction T. Meanwhile the arms 6 and 9 are respectively in the lower and receiving positions shown in solid lines and the roller 20 is in the illustrated upper position.

As soon as one of the detectors 15 senses that one of the rods 2 is touching the surface 45 the inching advance of the conveyor 3 is stopped and the actuator 44 pivots the arm 6 upward. This action catches the tip 13 of the arm 6 on the rod 2 touching the surface 45 and pushes it up as indicated by arrow 14 until the rod 2 is pushed into the mouth 10. If by some accident two or more rods 2 get caught atop the tip 13, the uppermost one will be pushed into the mouth 10.

When the detector 38 of the arm 9 senses that a rod 2 has been positioned in the mouth 10 it signals the controller 40 which immediately stops the upward advance of the arm 6 and then operates the actuator 36 to pivot down the arm 9, whereupon the arm 6 is also dropped. Such pivoting of the arm 9 sweeps the captured end of rod 2 along the surface 16 and drops it into the lower longitudinal-conveyor roller 21. Even if the end of the rod 2 opposite to that end engaged in the mouth 10 lies underneath other such rods, this placement of the rod in the roller 21 will take place.

Subsequently the other roller 20 drops down and the motor 20 rotates it to push the separated rod 2 out in the direction L. Meanwhile the conveyor 3 can be moving up the rods 2 that remain while the arm 9 pivots back to its starting position.

FIG. 3 illustrates how the plate 5' can have a vertical rear edge 34 instead of the curved edge 16. In this arrangement the arm 9 is replaced by an arm 33 that has as movable part 11 defining the mouth 10 and that can be pivoted about an axis 31 by an actuator 35 to grasp the workpiece rod 2. When thus grabbed the workpiece is swung over and dropped into the lower roller 21.

The system according to this invention can cycle rapidly enough to keep the workpieces coming in the direction L one at a time. The stop plate 5 and lifter 6 work so effectively that the machine will rarely drop a rod, and is capable of pulling rods that are even fairly bent out of a large group of such rods.

We claim:

1. A separating apparatus comprising:
   first, transverse conveying means adapted to support a plurality of elongated elements extending generally parallel to one another and for displacing the plurality of elements in a mainly horizontal transport direction transverse to the elements;
   second conveying means at the downstream end of the transverse conveying means for displacing the elements one at a time in a horizontal transport direction extending generally parallel to the elements;
   a single stationary stop at the downstream end of the transverse conveying means and positioned upstream from said second conveying means; said stop having a stop surface extending upward from said transverse conveying means, facing upstream in the transverse direction, and having an upper end spaced thereabove;

means including a single lifter displaceable upward along the stop surface for lifting an element engaged thereagainst up past the upper end of the stop surface; and means for receiving an element at the upper end from the lifter and depositing the received element in the second conveying means, said receiving means include a pair of members which are pivotally connected to each other and form a receiving mouth at their free ends remote from their pivot connection in which mouth the elongated element is received.

2. The separating apparatus defined in claim 1 further comprising:

sensor means at the stop surface for detecting when same is engaged by at least one of the elements; and control means connected to the sensor means and to means for operating the lifter in dependence on when elements are sensed at the stop surface.

3. The separating apparatus defined in claim 1 wherein said pair of members comprising a transverse pusher having said mouth and displaceable between a receiving position with the mouth open downward at the upper end and a drop off position above the second conveying means.

4. The separating apparatus defined in claim 3 wherein the transverse pusher is pivotal between its positions.

5. The separating apparatus defined in claim 3 wherein in the receiving position the mouth forms a continuation of the stop surface.

6. The separating apparatus defined in claim 3 wherein the width of the mouth is adjustable, whereby the mouth width can be set generally to the diameter of the elements being separated.

7. The separating apparatus defined in claim 1 wherein the lifter is formed as an arm pivotal about an axis and having a tip projecting from the axis past the stop surface, the stop surface being arcuate and generally arcuate about the axis.

8. The separating apparatus defined in claim 7 wherein the arm is of adjustable length, whereby the extent its tip projects past the stop surface can be set generally to the diameter of the elements being separated.

9. The separating apparatus defined in claim 7 wherein the tip forms with the stop surface an upwardly V-shaped seat for the elements.

10. The separating apparatus defined in claim 1 wherein the second conveying means includes a pair of vertically spaced rollers for longitudinally conveying the elements, each of the elements is deposited on a lower roller of said pair of rollers; one of said pair of rollers being vertically movable towards the other of said pair of rollers to engage each of the elements between said pair of rollers at the downstream end of the transverse conveying means.

* * * * *